United States Patent
Harvey

(10) Patent No.: US 12,237,479 B2
(45) Date of Patent: Feb. 25, 2025

(54) ELECTRIC BATTERY CELL DISCHARGE FIREWALL

(71) Applicant: Dell Products L.P., Round Rock, TX (US)

(72) Inventor: John P. Harvey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 608 days.

(21) Appl. No.: 17/515,803

(22) Filed: Nov. 1, 2021

(65) Prior Publication Data

US 2023/0137717 A1 May 4, 2023

(51) Int. Cl.
*H01M 10/44* (2006.01)
*H02J 7/00* (2006.01)

(52) U.S. Cl.
CPC ....... *H01M 10/443* (2013.01); *H01M 10/441* (2013.01); *H02J 7/00309* (2020.01); *H02J 7/0031* (2013.01); *H02J 7/007194* (2020.01)

(58) Field of Classification Search
CPC ............ H01M 10/441; H01M 10/443; H02J 7/00309; H02J 7/007194; H02J 7/0031
USPC ......................................... 320/136, 135, 150
See application file for complete search history.

(56) References Cited

U.S. PATENT DOCUMENTS

| | | | | |
|---|---|---|---|---|
| 9,704,384 | B2 * | 7/2017 | Bandhauer | H01M 10/6568 |
| 11,855,264 | B1 * | 12/2023 | Mueller | H01M 10/443 |
| 2011/0316483 | A1 * | 12/2011 | Zhang | H01M 10/486 320/118 |
| 2019/0351268 | A1 * | 11/2019 | Lee | H01M 10/486 |
| 2022/0006306 | A1 * | 1/2022 | Lee | H01M 10/441 |
| 2023/0030011 | A1 * | 2/2023 | Lee | H01M 10/441 |

* cited by examiner

*Primary Examiner* — Edward Tso
*Assistant Examiner* — Aaron Piggush
(74) *Attorney, Agent, or Firm* — Jackson Walker L.L.P.

(57) ABSTRACT

A battery module array for use in a battery-powered system may include a plurality of battery modules and a battery management unit configured to control operation of the plurality of battery modules, and further configured to, in response to a critical condition occurring with respect to an affected battery module of the plurality of battery modules: establish a discharge firewall comprising the affected battery module and one or more additional battery modules of the plurality of battery modules proximate to the affected battery module and prioritize discharging of the affected battery module and one or more additional battery modules over discharging of those of the plurality of battery modules outside of the discharge firewall.

18 Claims, 5 Drawing Sheets

ELECTRIC BATTERY CELL DISCHARGE FIREWALL

TECHNICAL FIELD

The present disclosure relates to information handling systems and other battery-powered systems. More specifically, embodiments of the disclosure provide systems and methods for creating a firewall in an electrical battery array to reduce or eliminate a risk of fire in an information handling system or other battery-powered system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many computing applications, an information handling system may include a rechargeable battery or other energy storage device that may serve as an energy source to power components of the information handling system in the event that a "main" power source (e.g., an alternating current power source or a direct current power source adapted from an alternating current power source) is removed or otherwise withdrawn from the information handling system. Other electric and/or electronic systems may include one or more batteries for use as a source of electrical energy for powering components of such electric and/or electronic systems.

Batteries for use in battery-powered systems often include lithium-ion batteries. Lithium-ion batteries are commonly used for portable electronics and electric vehicles and are growing in popularity for military and aerospace applications.

One risk in the use of lithium-ion batteries is their use of a flammable electrolyte. Thus, a lithium-battery that is short-circuited, damaged, and/or overheated may lead to an explosion or fire. Even more risk may exist in an array of batteries, where charged batteries in an array proximate to a short-circuited, damaged, and/or overheated battery that catches fire may undesirably provide additional fuel to the fire. Accordingly, systems and methods for reducing or eliminating such risk of fire and explosions are desirable.

SUMMARY

In accordance with the teachings of the present disclosure, the disadvantages and problems associated with the potential flammability of batteries have been substantially reduced or eliminated.

In accordance with embodiments of the present disclosure, a battery module array for use in a battery-powered system may include a plurality of battery modules and a battery management unit configured to control operation of the plurality of battery modules, and further configured to, in response to a critical condition occurring with respect to an affected battery module of the plurality of battery modules: establish a discharge firewall comprising the affected battery module and one or more additional battery modules of the plurality of battery modules proximate to the affected battery module and prioritize discharging of the affected battery module and one or more additional battery modules over discharging of those of the plurality of battery modules outside of the discharge firewall.

In accordance with these and other embodiments of the present disclosure, a method may include, in a battery module array having a plurality of battery modules for use in a battery-powered system, in response to a critical condition occurring with respect to an affected battery module of the plurality of battery modules: establishing a discharge firewall comprising the affected battery module and one or more additional battery modules of the plurality of battery modules proximate to the affected battery module and prioritizing discharging of the affected battery module and one or more additional battery modules over discharging of those of the plurality of battery modules outside of the discharge firewall.

In accordance with these and other embodiments of the present disclosure, an article of manufacture may include a non-transitory computer-readable medium and computer-executable instructions carried on the computer readable medium, the instructions readable by a processor, the instructions, when read and executed, for causing the processor to, in a battery module array having a plurality of battery modules for use in a battery-powered system, and in response to a critical condition occurring with respect to an affected battery module of the plurality of battery modules: establish a discharge firewall comprising the affected battery module and one or more additional battery modules of the plurality of battery modules proximate to the affected battery module and prioritize discharging of the affected battery module and one or more additional battery modules over discharging of those of the plurality of battery modules outside of the discharge firewall.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

In this disclosure, the term "information handling resource" may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

Figure 1:
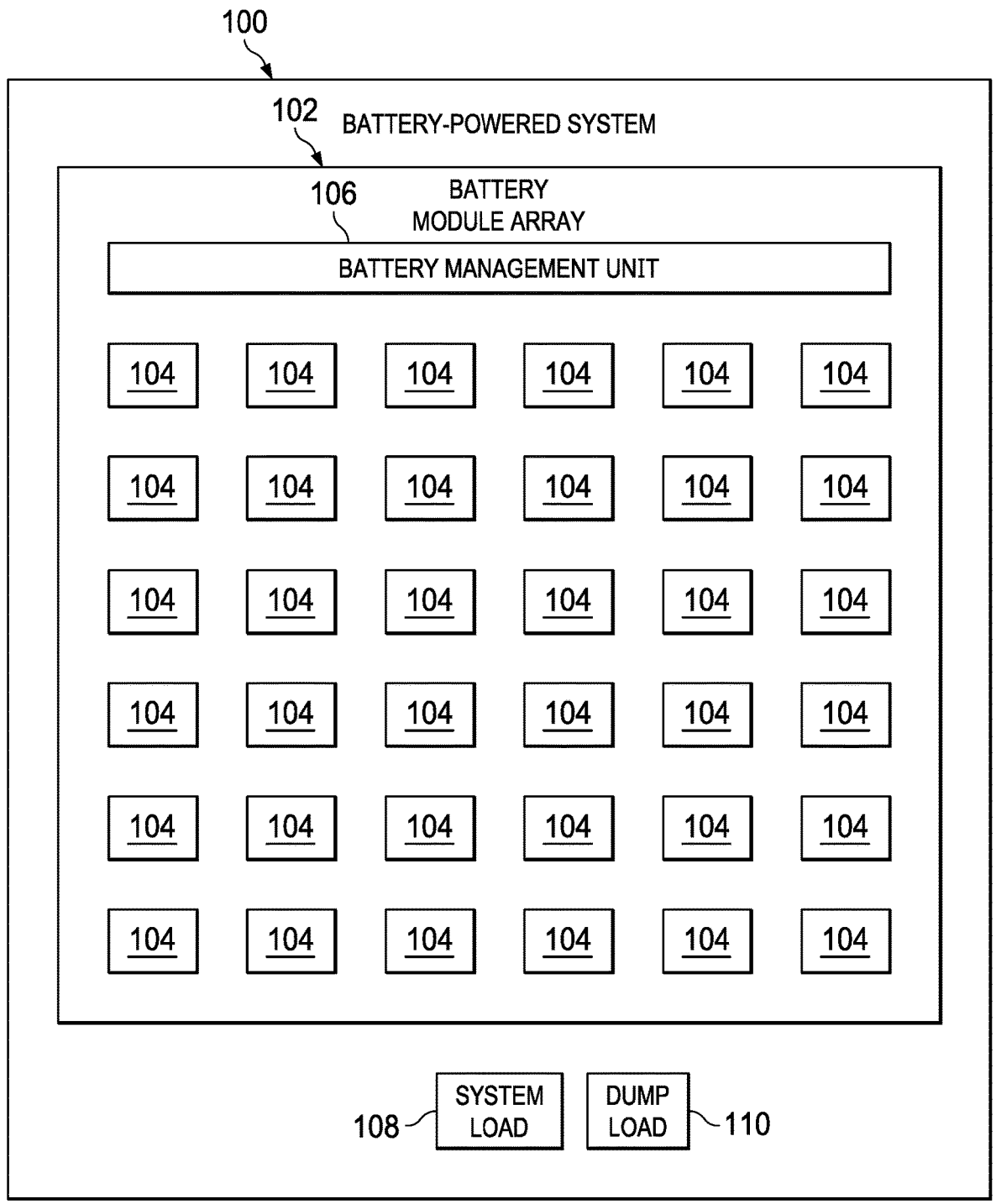
FIG. 1 illustrates a block diagram of selected components of a battery-powered system, in accordance with embodiments of the present disclosure.

FIG. 1 illustrates a block diagram of selected components of a battery-powered system 100, in accordance with embodiments of the present disclosure. Battery-powered system 100 may include any system, device, or apparatus that includes one or more electric and/or electronic components powered in whole or in part by an electrical battery. For example, battery-powered system 100 may include, without limitation, an information handling system (e.g., a notebook, tablet, or laptop computer), a smart phone, a plug-in electric vehicle, a hybrid electric vehicle, a power bank, a telecommunications backup power system, and a grid scale power storage array. As shown in FIG. 1, battery-powered system 100 may include a battery module array 102, a system load 108, and a dump load 110.

As depicted in FIG. 1, battery module array 102 may include a plurality of battery modules 104 and a battery management unit 106. A battery module 104 may include any system, device, or apparatus configured to store electrochemical energy, and convert such electrochemical energy to electrical energy to discharge such battery module 104 and deliver such electrical energy to one or more electric and/or electronic components of battery-powered system 100. Each battery module 104 may comprise a single cell battery, a multiple-cell battery, a laptop-computer-sized or briefcase-sized grouping of batteries, a cabinet drawer of a grouping of batteries, a cabinet including drawers of batteries, and/or a shipping container comprising cabinets of batteries.

For purposes of clarity and exposition, FIG. 1 depicts battery module array 102 arranged in a two-dimensional array of battery modules 104. However, in some embodiments, battery module array 102 may be arranged in a three-dimensional array of battery modules 104.

Battery management unit 106 may comprise a microprocessor, DSP, ASIC, FPGA, EEPROM, or any combination thereof, or any other device, system, or apparatus for controlling operation of battery modules 104, including creation of a discharge firewall as described in greater detail below. As such, battery management unit 106 may comprise firmware, logic, and/or data for controlling functionality of battery modules 104.

System load 108 may comprise one or more electric and/or electronic devices powered from battery modules 104 during normal operation of battery-powered system 100. For example, for embodiments in which battery-powered system 100 comprises an information handling system (e.g., laptop, notebook, tablet, smartphone, etc.), system load 108 may comprise one or more processors, memories, input/output devices (e.g., keyboard, trackpads, displays, microphones, speakers, etc.), communications hardware (e.g., network interfaces, BLUETOOTH interfaces, Wireless Fidelity (Wi-Fi) interfaces, cellular interfaces, etc.), cooling fans, etc. As another example, for embodiments in which battery-powered system 100 comprises an electric vehicle or hybrid electric vehicle, system load 108 may comprise an electric motor, electronics (e.g., dashboard indicators, car audio system, etc.), heating/ventilation/air conditioning system, etc.

Dump load 110 may comprise one or more electrical impedances (e.g., high-power resistors) to facilitate discharging of battery modules 104 when a discharge firewall is created, as described in greater detail below. In some embodiments, a cooling subsystem (e.g., fans, blowers, and/or other air movers) integral or otherwise thermally coupled to dump load 110 may actively cool dump load 110 when battery modules 104 are discharged to dump load 110, in order to prevent overheating of dump load 110.

Figure 2:
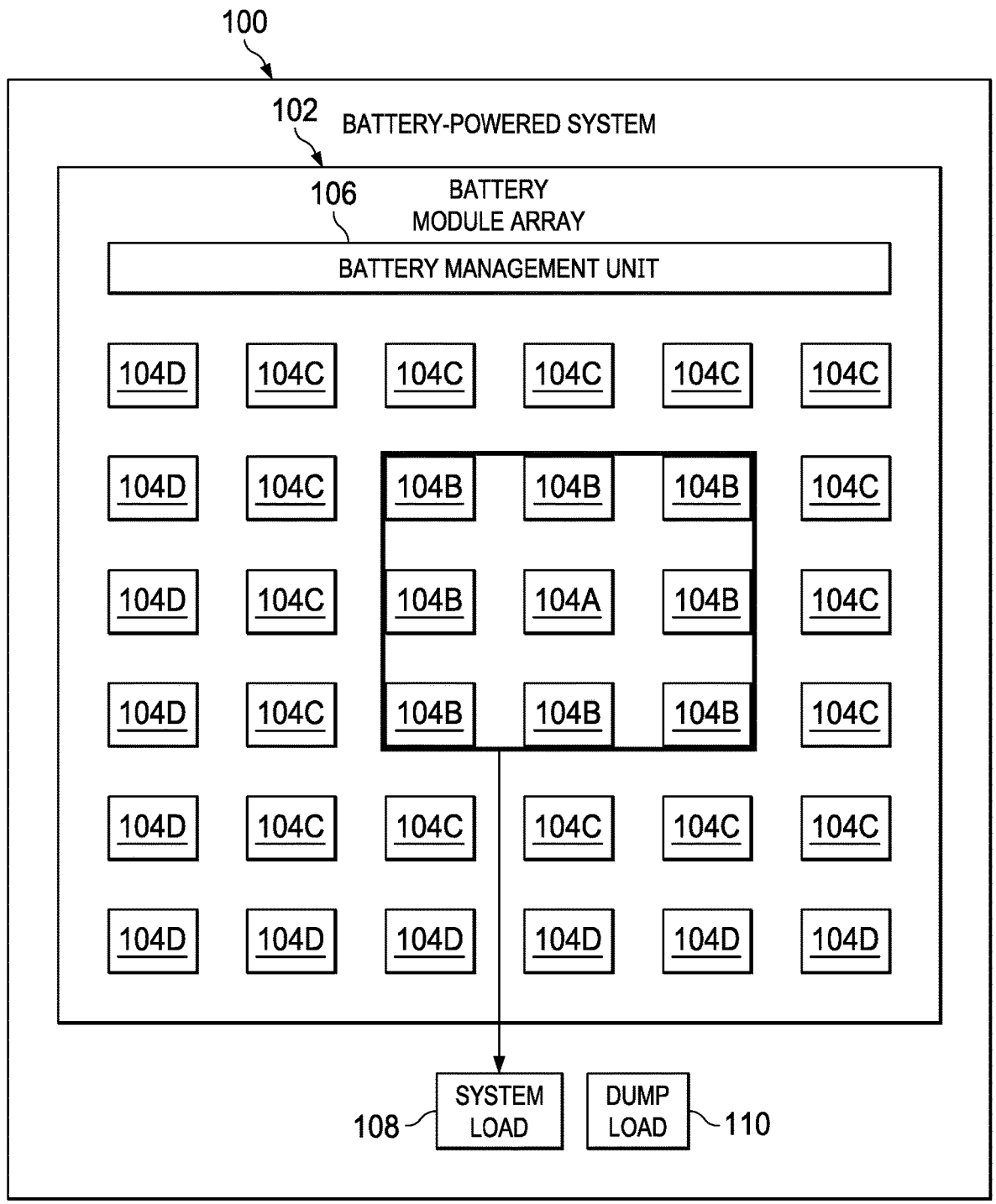
FIG. 2 illustrates a block diagram of selected components of a battery-powered system wherein battery modules of a discharge firewall discharge to a system load of the battery-powered system, in accordance with embodiments of the present disclosure.

In operation, as shown in FIG. 2, a particular battery module 104A may enter a critical condition for implementing a discharge firewall. In some embodiments, such critical condition may include a temperature within or proximate to battery module 104A rising above a threshold temperature, which may indicate that battery module 104A is overheating and may be susceptible to catching fire. In these and other embodiments, such critical condition may comprise battery module 104A catching on fire.

In response to the critical condition, battery management unit 106 may halt charging to battery modules 104 and implement a discharge firewall comprising the critical-condition battery module 104A and battery modules 104B proximate to critical-condition battery module 104A, as indicated by the thick rectangle surrounding battery module 104A and battery modules 104B as shown in FIGS. 2-5. Although FIG. 2 depicts the discharge firewall comprising critical-condition battery module 104A and battery modules 104B immediately adjacent to critical-condition battery module 104A, in some embodiments, additional battery modules 104 further away from critical-condition battery module 104A (e.g., battery modules 104C) may also be included within the discharge firewall.

Figure 3:
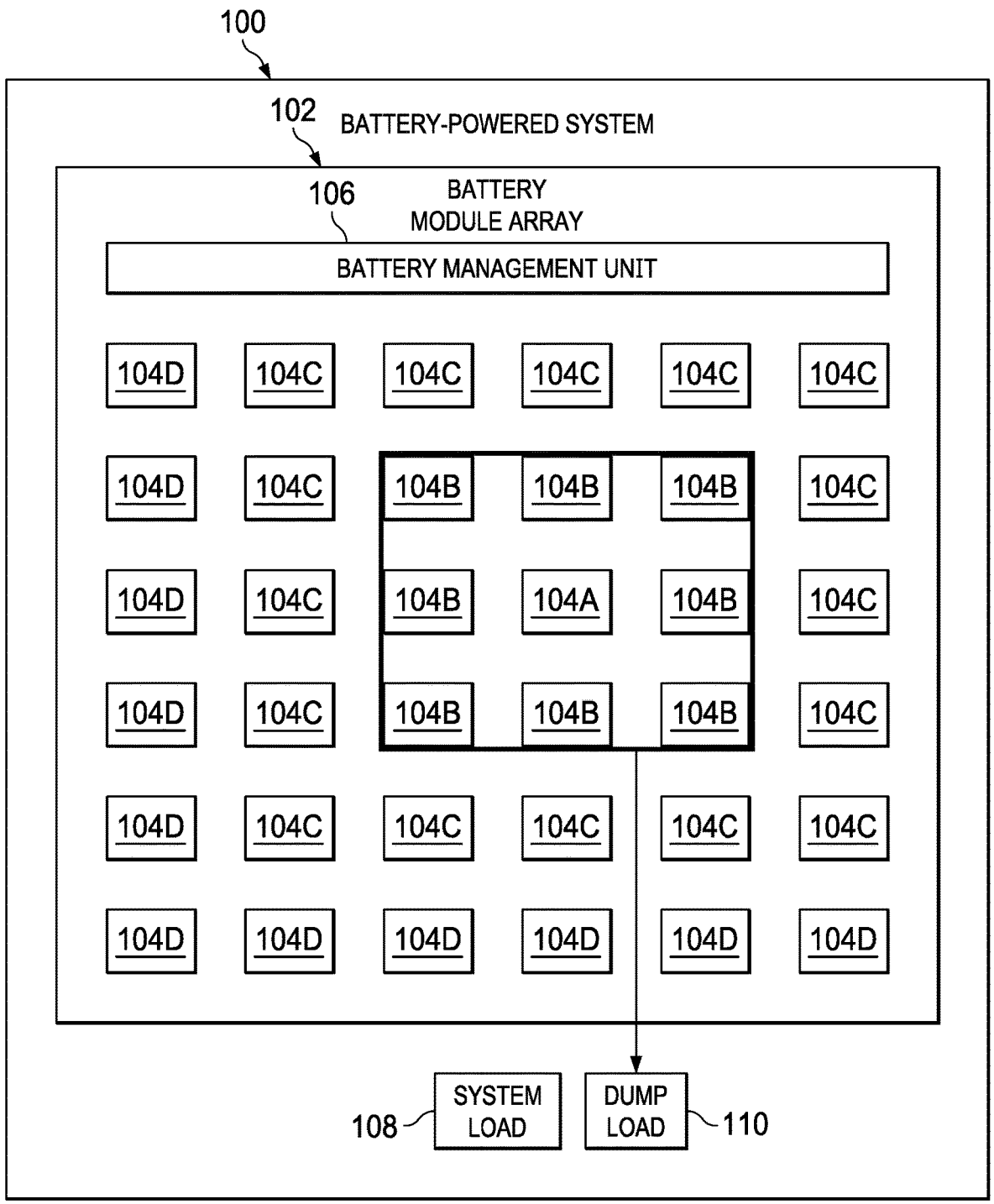
FIG. 3 illustrates a block diagram of selected components of a battery-powered system wherein battery modules of a discharge firewall discharge to a dump load of the battery-powered system, in accordance with embodiments of the present disclosure.

Having identified the battery modules 104 within the discharge firewall, battery management unit 106 may prioritize discharging of battery modules 104 within the discharge firewall in order to deplete energy from such battery modules 104, which may reduce fuel available to any fire that may be caused by overheating of critical-condition battery module 104A. For example, as shown in FIG. 2, battery management unit 106 may prioritize the battery modules 104 within the discharge firewall to discharge to one or more components of system load 108. As another example, as shown in FIG. 3, battery management unit 106 may cause battery modules 104 within the discharge firewall to discharge to dump load 110.

In some embodiments, battery management unit 106 may cause battery modules 104 within the discharge firewall to discharge to system load 108 and/or dump load 110 at their maximum discharge rates. However, discharging of battery modules 104 within the discharge firewall may cause such battery modules 104 to heat up, and thus in some embodiments, battery management unit 106 may be configured to limit discharge rates to balance the urgency of discharging battery modules 104 with the need to maintain temperatures of such battery modules 104 below temperatures at which a fire or explosion may occur.

In these and other embodiments, battery management unit 106 may be configured to, once battery modules 104 within the discharge firewall are depleted of charge, extend the discharge firewall to additional battery modules 104 proximate to the existing discharge firewall. For example, in the approaches depicted in FIGS. 2 and 3, once battery modules 104A and 104B are fully discharged, battery management unit 106 may next prioritize discharge of battery modules 104C, then prioritize discharge of battery modules 104D once battery modules 104C are fully discharged.

In these and other embodiments, battery management unit 106 may prioritize some battery modules 104 within the discharge firewall to have a faster discharge rate over other battery modules 104 within the discharge firewall. For example, if a discharge firewall includes battery modules 104A, 104B, and 104C, battery management unit 106 may cause battery module 104A to have a faster discharge rate than battery modules 104B, and cause battery modules 104B to have a faster discharge rate than battery modules 104C.

Figure 4:
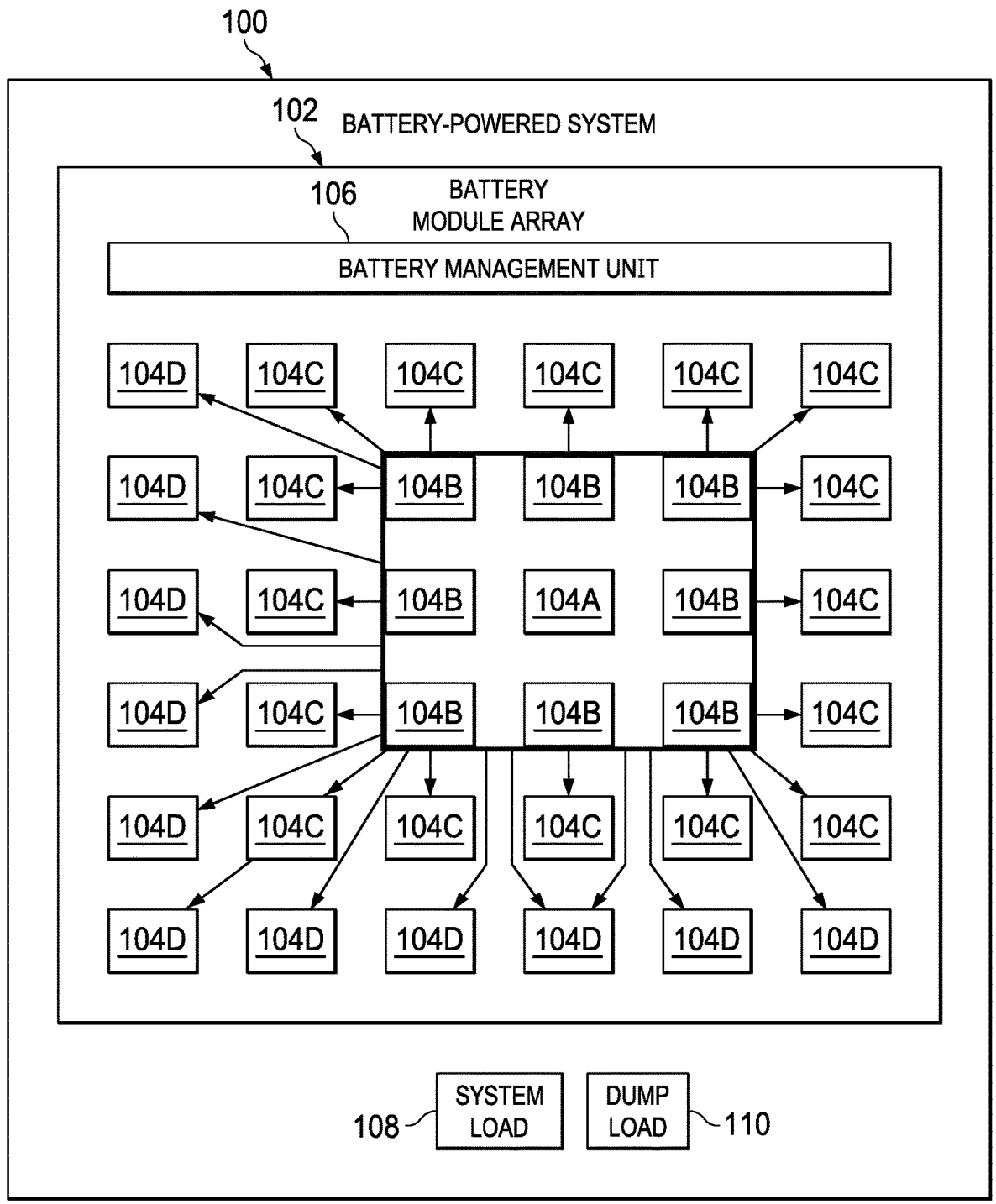
FIG. 4 illustrates a block diagram of selected components of a battery-powered system wherein battery modules of a discharge firewall discharge to battery modules outside of the discharge firewall, in accordance with embodiments of the present disclosure.

As a further example, as shown in FIG. 4, battery management unit 106 may cause battery modules 104 within the discharge firewall to discharge to battery modules 104 outside of the discharge firewall. Such an approach may be useful if system load 108 is not active and no dump load 110 is available. To illustrate, if battery modules 104 outside of the discharge firewall are not fully charged, energy from battery modules 104 within the discharge firewall may be redistributed to battery modules 104 outside of the discharge firewall. In some embodiments, battery management unit 106 may cause such energy transfer to occur at the maximum rates supported by the various battery modules 104. In these and other embodiments, battery management unit 106 may also prioritize the transfer of energy to battery modules 104 which are more distant to critical condition battery module 104A (e.g., prioritize energy transfer to battery modules 104D over battery modules 104C).

Figure 5:
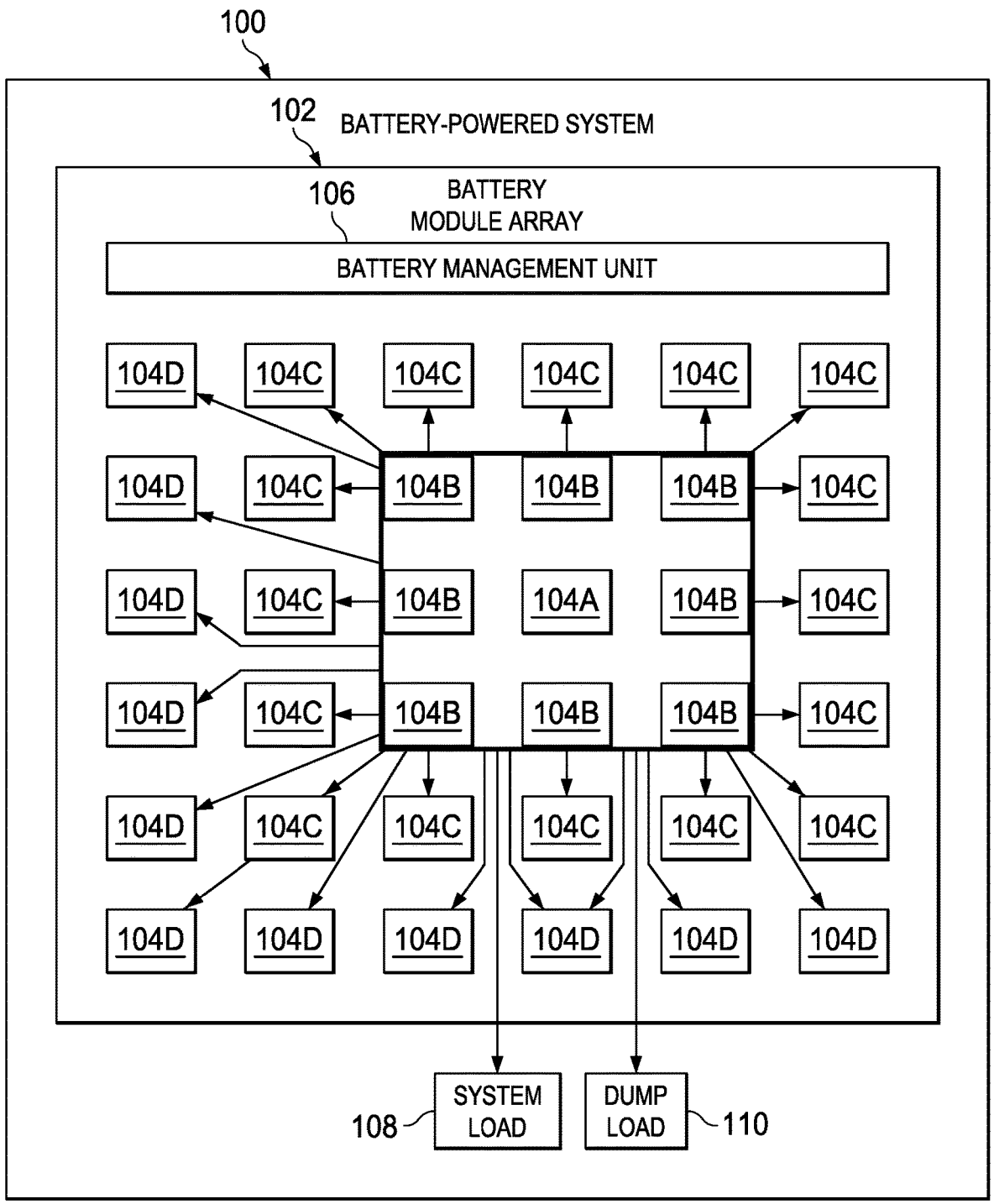
FIG. 5 illustrates a block diagram of selected components of a battery-powered system wherein battery modules of a discharge firewall discharge to a system load of the battery-powered system, a dump load of the battery-powered system, and to battery modules outside of the discharge firewall, in accordance with embodiments of the present disclosure.

In some embodiments, battery management unit 106 may use two or more of the approaches described with respect to FIGS. 2, 3, and 3 in order to discharge battery modules 104 within the discharge firewall. For example, FIG. 5 depicts discharging of battery modules 104 within the discharge firewall using all three approaches depicted with respect to FIGS. 2, 3, and 4.

In addition to the approaches described above, in situations in which system load 108 is inactive and no dump load is available, in some embodiments, battery management unit 106 may be able to create a dump load using inactive components of system load 108. For example, in an information handling system having air movers for cooling, battery management unit 106 may create a dump load by setting such air movers to their maximum speed (e.g., provided that such air movers are not already at maximum speed). As another example, in an information handling system, battery management unit 106 may create a dump load by setting a display to its maximum brightness and/or playing white noise or noise at inaudible frequencies through speakers of the information handling system.

For grid scale storage it may be possible for battery management unit 106 to create a dump load by setting a zero or negative energy price, in effect paying customers to take energy from battery-powered system 100, especially where the cost of such payment is less than the cost of possible damage of not discharging battery module array 102.

A parked electric vehicle may not have a dump load available. For grid-integrated vehicles coupled to a charge station, it may be possible to set a zero or negative energy price as described above. In addition or alternatively, in an electric vehicle, battery management unit 106 may cause the electric vehicle to turn on all lights, the heating/ventilation/air conditioning system, audio system (e.g., to play white noise or noise at inaudible frequencies) and/or other components that may dissipate energy. In addition or alternatively, battery management unit 106 may cause oscillating power signals to be sent to the electric motor such that the electric motor does not rotate but still uses up energy.

In a hybrid electric vehicle, battery management unit 106 may cause the internal combustion engine to rotate with the engine fuel disconnected.

For a battery backup system, battery management unit 106 may cause a load of the battery backup system to switch from grid-powered to battery-powered as if there was a grid outage.

In the case of a data center, battery management unit 106 may cause servers within such data center to create extra load, assuming they are not already at full capacity. For example, a battery backup system may be switched from grid-powered to battery-powered, and the servers may be configured to execute programs, in addition to their normal loads, designed to exercise the processors to consume power with their air movers at maximum speed to both use power and carry the heat away.

In a smartphone, battery management unit 106 may cause the brightness of a display to be maximized and/or turn on a camera flash light-emitting diode to its maximum brightness (e.g., flashlight/torch mode). In addition or alternatively, battery management unit 106 may cause transmission of cellular, BLUETOOTH, and/or Wi-Fi signals to non-existent destinations, assuming there is no service or such modes of transmission are not otherwise in use. In addition or alternatively, battery management unit 106 may cause white noise or inaudible noise to be played to speaker(s) of the smartphone.

In the case of an autonomous electric vehicle, the vehicle may be able to provide extra firewalling by being programmed to automatically re-locate in the event a discharge firewall is created, in order to mitigate damage in the event of a fire. For example, an autonomous electric vehicle in a crowded part of a parking lot may be programmed to move to a less crowed portion of the parking lot, potentially reducing risk to nearby vehicles and people. In a full parking lot, the autonomous electric vehicle may be programmed to relocate to an edge or a corner of the parking lot, to reduce the number of directly adjacent vehicles.

An autonomous electric vehicle with an overheating battery parked inside a residential garage may be able to be programmed to open a garage door and exit the garage, thus reducing the risk to the garage and any attached house. In the event that such autonomous electric vehicle is unable to automatically open the garage door, it may be beneficial that the autonomous electric vehicle is programmed to push through the garage door because damage to the garage door may be preferable to the risk of losing the garage and any attached house.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A battery module array for use in a battery-powered system, the battery module array comprising:
    a plurality of battery modules; and
    a battery management unit configured to control operation of the plurality of battery modules, and further configured to, in response to a critical condition occurring with respect to an affected battery module of the plurality of battery modules:
        establish a discharge firewall comprising the affected battery module and one or more additional battery modules of the plurality of battery modules proximate to the affected battery module; and
        prioritize discharging of the affected battery module and one or more additional battery modules of the plurality of battery modules proximate to the affected battery module over discharging of at least one battery module of the plurality of battery modules outside of the discharge firewall by discharging the affected battery module and one or more additional battery modules of the plurality of battery modules proximate to the affected battery module to a system load of the battery-powered system, the system load comprising one or more components of the battery-powered system configured to draw electrical energy from the plurality of battery modules in the absence of the critical condition.

2. The battery module array of claim 1, wherein the critical condition comprises a temperature associated with the affected battery module exceeding a threshold temperature.

3. The battery module array of claim 1, wherein the critical condition comprises the affected battery module catching on fire.

4. A battery module array for use in a battery-powered system, the battery module array comprising:
    a plurality of battery modules; and
    a battery management unit configured to control operation of the plurality of battery modules, and further configured to, in response to a critical condition occurring with respect to an affected battery module of the plurality of battery modules:
        establish a discharge firewall comprising the affected battery module and one or more additional battery modules of the plurality of battery modules proximate to the affected battery module; and prioritize discharging of the affected battery module and one or more additional battery modules of the plurality of battery modules proximate to the affected battery module over discharging of at least one battery module of the plurality of battery modules outside of the discharge firewall by discharging the affected battery module and one or more additional battery modules of the plurality of battery modules proximate to the affected battery module to at least one battery module of the plurality of battery modules outside of the discharge firewall.

5. The battery module array of claim 4, wherein the critical condition comprises a temperature associated with the affected battery module exceeding a threshold temperature.

6. The battery module array of claim 4, wherein the critical condition comprises the affected battery module catching on fire.

7. A method comprising, in a battery module array having a plurality of battery modules for use in a battery-powered system:

in response to a critical condition occurring with respect to an affected battery module of the plurality of battery modules:

establishing a discharge firewall comprising the affected battery module and one or more additional battery modules of the plurality of battery modules proximate to the affected battery module; and prioritizing discharging of the affected battery module and one or more additional battery modules of the plurality of battery modules proximate to the affected battery module over discharging of at least one battery module of the plurality of battery modules outside of the discharge firewall by discharging the affected battery module and one or more additional battery modules of the plurality of battery modules proximate to the affected battery module to a system load of the battery-powered system, the system load comprising one or more components of the battery-powered system configured to draw electrical energy from the plurality of battery modules in the absence of the critical condition.

8. The method of claim 7, wherein the critical condition comprises a temperature associated with the affected battery module exceeding a threshold temperature.

9. The method of claim 7, wherein the critical condition comprises the affected battery module catching on fire.

10. A method comprising, in a battery module array having a plurality of battery modules for use in a battery-powered system:

in response to a critical condition occurring with respect to an affected battery module of the plurality of battery modules:

establishing a discharge firewall comprising the affected battery module and one or more additional battery modules of the plurality of battery modules proximate to the affected battery module; and prioritizing discharging of the affected battery module and one or more additional battery modules of the plurality of battery modules proximate to the affected battery module over discharging of at least one battery module of the plurality of battery modules outside of the discharge firewall by discharging the affected battery module and one or more additional battery modules of the plurality of battery modules proximate to the affected battery module to at least one battery module of the plurality of battery modules outside of the discharge firewall.

11. The method of claim 10, wherein the critical condition comprises a temperature associated with the affected battery module exceeding a threshold temperature.

12. The method of claim 10, wherein the critical condition comprises the affected battery module catching on fire.

13. An article manufacture comprising:

a non-transitory computer-readable medium; and computer-executable instructions carried on the computer readable medium, the instructions readable by a processor in a battery-powered system comprising a battery module array having a plurality of battery modules, the instructions, when read and executed, configured to cause the processor to:

in response to a critical condition occurring with respect to an affected battery module of the plurality of battery modules:

establish a discharge firewall comprising the affected battery module and one or more additional battery modules of the plurality of battery modules proximate to the affected battery module; and prioritize discharging of the affected battery module and one or more additional battery modules of the plurality of battery modules proximate to the affected battery module over discharging of at least one battery module of the plurality of battery modules outside of the discharge firewall by discharging the affected battery module and one or more additional battery modules of the plurality of battery modules proximate to the affected battery module to a system load of the battery-powered system, the system load comprising one or more components of the battery-powered system configured to draw electrical energy from the plurality of battery modules in the absence of the critical condition.

14. The article of claim 13, wherein the critical condition comprises a temperature associated with the affected battery module exceeding a threshold temperature.

15. The article of claim 13, wherein the critical condition comprises the affected battery module catching on fire.

16. An article manufacture comprising:

a non-transitory computer-readable medium; and computer-executable instructions carried on the computer readable medium, the instructions readable by a processor in a battery-powered system comprising a battery module array having a plurality of battery modules, the instructions, when read and executed, configured to cause the processor to:

in response to a critical condition occurring with respect to an affected battery module of the plurality of battery modules:

establish a discharge firewall comprising the affected battery module and one or more additional battery modules of the plurality of battery modules proximate to the affected battery module; and to prioritize discharging of the affected battery module and one or more additional battery modules of the plurality of battery modules proximate to the affected battery module over discharging of at least one battery module of the plurality of battery modules outside of the discharge firewall by discharging the affected battery module and one or more additional battery modules of the plurality of battery modules proximate to the affected battery module to at least one battery module of the plurality of battery modules outside of the discharge firewall.

17. The article of claim 16, wherein the critical condition comprises a temperature associated with the affected battery module exceeding a threshold temperature.

18. The article of claim 16, wherein the critical condition comprises the affected battery module catching on fire.

* * * * *